(12) United States Patent
Blasco Claret et al.

(10) Patent No.: US 8,885,689 B2
(45) Date of Patent: Nov. 11, 2014

(54) COMMUNICATION NODE INCLUDING TRANSCEIVERS TRANSMITTING ON DIFFERENT TYPES OF TRANSMISSION LINES AND PERFORMING DATA REPEATING FUNCTIONS

(75) Inventors: Jorge Vicente Blasco Claret, Valencia (ES); Jose Luis Gonzalez Moreno, Valencia (ES); Salvador Iranzo Molinero, Valencia (ES); John Vincent Egan, Palm Harbor, FL (US); Agustin Badenes Corella, Castellon (ES)

(73) Assignee: Marvell Hispania S. L., Madrid (ES)

( * ) Notice: Subject to any disclaimer, the term of this patent is extended or adjusted under 35 U.S.C. 154(b) by 25 days.

(21) Appl. No.: 13/120,527

(22) PCT Filed: Mar. 22, 2011
(Under 37 CFR 1.47)

(86) PCT No.: PCT/US2011/029371
§ 371 (c)(1),
(2), (4) Date: Nov. 29, 2011

(87) PCT Pub. No.: WO2011/119567
PCT Pub. Date: Sep. 29, 2011

(65) Prior Publication Data
US 2013/0010838 A1 Jan. 10, 2013

(30) Foreign Application Priority Data
Mar. 22, 2010 (ES) .................................. 201030411

(51) Int. Cl.
*H04B 3/36* (2006.01)

(52) U.S. Cl.
USPC ........... 375/211; 375/219; 375/220; 375/260; 375/295; 375/316; 455/73; 455/14; 455/15; 455/16; 455/88; 455/90.3; 455/402; 370/246; 370/247; 370/274; 370/272; 370/293; 370/493; 370/401; 370/502; 370/469; 340/425.1

(58) Field of Classification Search
USPC ............... 455/73, 14, 15, 16, 88, 553.1, 90.3, 455/402; 375/211, 219, 220, 260, 295, 316; 370/246, 247, 274, 272, 293, 493, 401, 370/502, 469; 340/425.1
See application file for complete search history.

(56) References Cited

U.S. PATENT DOCUMENTS 5,926,476 A 7/1999 Ghaibeh
6,947,736 B2 * 9/2005 Shaver et al. ................. 455/424
(Continued)

FOREIGN PATENT DOCUMENTS

WO WO9801977 A2 1/1998
WO WO2007/064136 6/2007

OTHER PUBLICATIONS

Spanish Patent and Trademark Office; Office Action Dated Feb. 6, 2013.
(Continued)

*Primary Examiner* — Rahel Guarino

(57) ABSTRACT

A first node including a physical layer device, a first transceiver and a second transceiver. The first transceiver includes a first analog front end connected to a first transmission line. The first analog front end is configured to transfer first data between the physical layer device and a second node via the first transmission line. The second transceiver includes a second analog front end connected to a second transmission line. The second analog front end is configured to transfer second data between the physical layer device and a third node via the second transmission line. A first type of the second transmission line is different than a second type of the first transmission line. The first node is configured to perform as a repeater using data repeating functions at a link layer control level.

20 Claims, 6 Drawing Sheets

(56) References Cited

U.S. PATENT DOCUMENTS

| | | |
|---|---|---|
| 7,860,146 B2 * | 12/2010 | Molina et al. ............... 375/130 |
| 2001/0048692 A1 | 12/2001 | Karner |
| 2004/0227623 A1 | 11/2004 | Pozsgay |
| 2005/0063363 A1 | 3/2005 | Lazar et al. |
| 2006/0269001 A1 | 11/2006 | Dawson et al. |
| 2007/0201540 A1 * | 8/2007 | Berkman ..................... 375/219 |

OTHER PUBLICATIONS

International Preliminary Report on Patentability and Written Opinion of the International Searching Authority; Int'l. App. No. PCT/US2011/029371 filed Mar. 22, 2011 (5 pages).

* cited by examiner

COMMUNICATION NODE INCLUDING TRANSCEIVERS TRANSMITTING ON DIFFERENT TYPES OF TRANSMISSION LINES AND PERFORMING DATA REPEATING FUNCTIONS

CROSS-REFERENCE TO RELATED APPLICATIONS

This application claims the benefit of Spanish Application ES201030411, filed Mar. 22, 2010. The disclosure of the above application is incorporated herein by reference in its entirety.

FIELD

This invention applies to communication systems that use various means of transmission. In particular, the node and procedure of the invention permit that a node of a communication network can be connected to various means of communication at a time and can communicate with the nodes connected to any of said means of transmission.

BACKGROUND

For the purpose of increasing coverage of the communication networks, various means of transmission are available (electric, coaxial and telephone cable or wire) connected among themselves to achieve a common communication network.

With this purpose, systems known until now use different nodes for each means and switch among them.

In FIG. 1, node 1 can communicate with node 2 by using the proper OFDM parameter configuration for the means of transmission. The installation can be expanded to two or more networks (domains) that operate with different means. For nodes connected to different means to be able to communicate data, it is necessary to have equipment (Gateway) that has two nodes connected to each of the means and a bridge to exchange data among them. In FIG. 2, if node 1 wants to send a message to node 6, node 1 must send the message to node 3 through the coaxial means while using the transmission parameters for the coaxial means. Node 3 will pass the message on through the bridge to node 4 which will transmit the message using the transmission parameters for the PLC means (electric power system) to node 6. The problem with this solution is that the complexity increases in direct relation to the number of interconnected means. If there are N means, the complexity and cost of the system practically increases N times.

As can be observed, each means operates independently at the access or port level to the means with its own MAP message (access-to-means plan) that describes accesses or ports to the channel during an access cycle to the means (MAC cycle). Data can be transmitted simultaneously over the two means. To communicate, each node uses parameters relevant to its means of transmission. If data is to be sent to a node which is located in another means, the data must first be sent to the node that interconnects the means. An example of these systems is described in patent application US2009302969 A1.

Other solutions (also described in patent application US2009302969 A1) use passive bridges that physically connect the various means. Though the cost of this solution can be less, the method of interconnecting the means among themselves in a passive manner causes attenuation among nodes to increase by having the various means of transmission in parallel, penalizing the connections which by themselves already had considerable attenuation. Further, the noisiest means would be limiting the dynamic margin of the cleanest means by increasing their noise level or base.

Another limitation is that the PSD (Power Spectral Density) cannot be adjusted for each of the means and that the power that passes from one to the other depends on factors that are beyond our control. This would require injecting the minimum power permitted in the most restrictive means, whereby one would penalize the means in which more power could be injected.

SUMMARY

According to the invention, a node and procedure according to independent claims is provided. Favorable embodiments are defined in the dependent claims.

According to an aspect of the invention, a node configured for its use in a data signals communication system is provided through N different means of transmission, characterized in that it comprises N independent AFEs and where each AFE is configured to receive or transmit the signal in a corresponding means of the N different means of transmission.

As a result thereof, they are optimized in injected power as well as in sensitivity to extract the best dynamic margin from each means.

According to an additional aspect of the invention, a procedure is provided for data signal communication through N different means of transmission, characterized by the communication taking place through a node which is connected to the N means through N AFEs and where each AFE receives or transmits the signal in a corresponding means of the N different means of transmission.

Thanks to the use of the procedure, the node can be connected to different means at a time and can communicate with the nodes connected to any of said means.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

In the case of networks through wiring inside a house, the means of transmission can be one of the following:

PLC ("power line system")
Telephone line
Coaxial cable
CAT5 cable or similar (Ethernet type)

Figure 3:
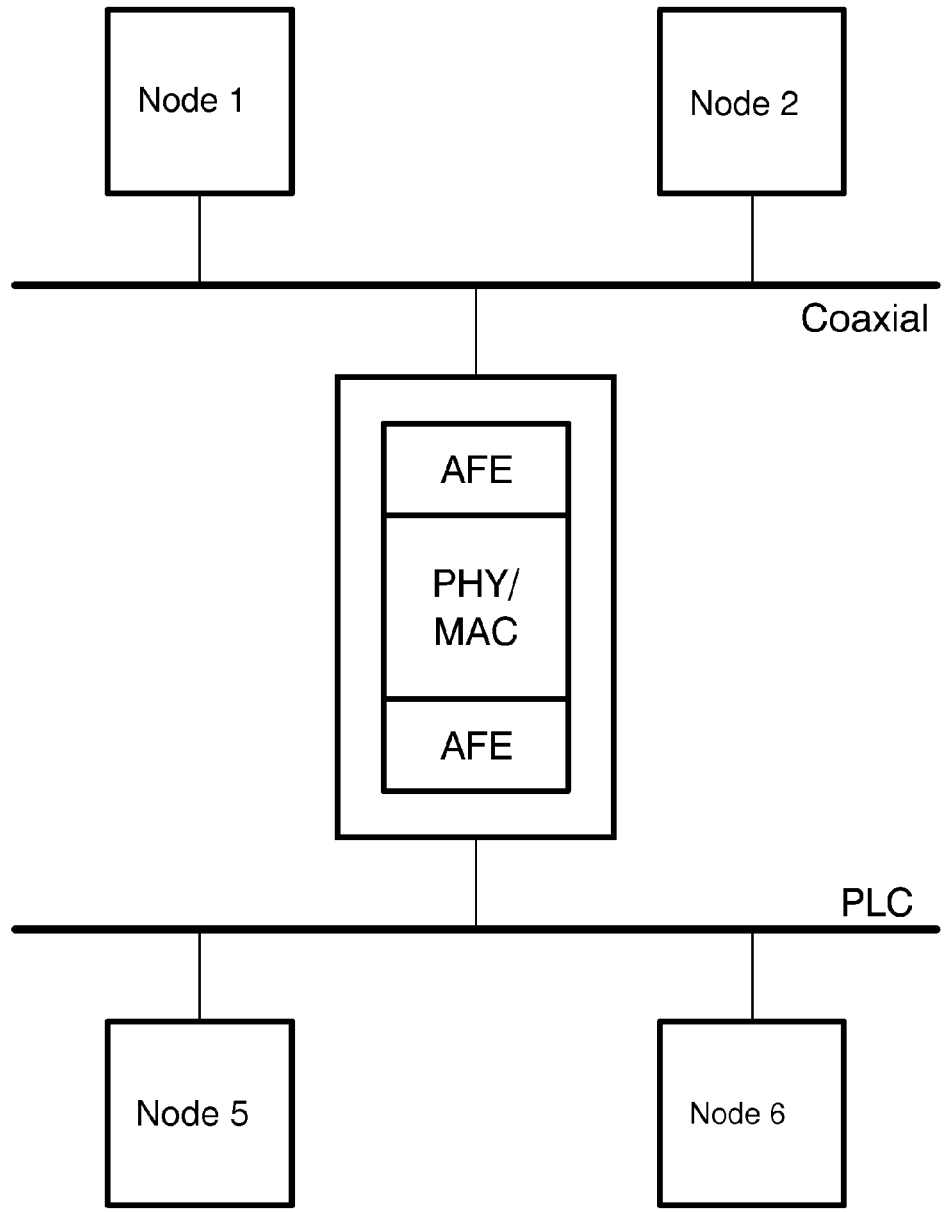
FIG. 3 is a representation of a communication system with two distinct transmission means in accordance with this invention.
Figure 4:
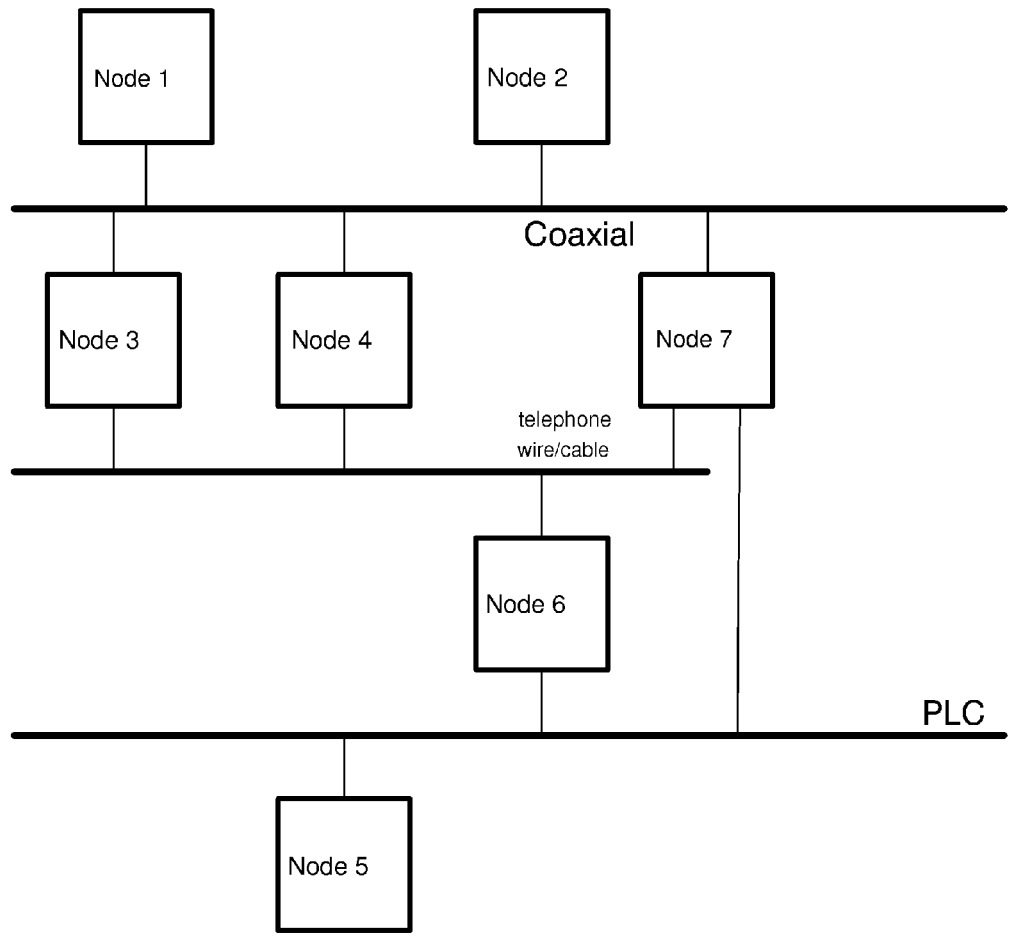
FIG. 4 is a representation of a communication system with three distinct transmission means in accordance with this invention.

According to this invention, the equipment that interconnects the means contains a single node (and not one for each means of transmission), with a single multi-means network (domain) (and not as many networks as there are means) (FIGS. 3 and 4). This node is connected to the different means with an independent AFE (Analog Front End) for each means. Since it is a single node, there is only one AMP (access-to-means plan). And all means operate jointly at the access-to-means level. Each of the AFEs is configured to inject the signal into the specific means to which it is connected while complying with the power spectral density (PSD) masks permitted in each means.

Figure 1:
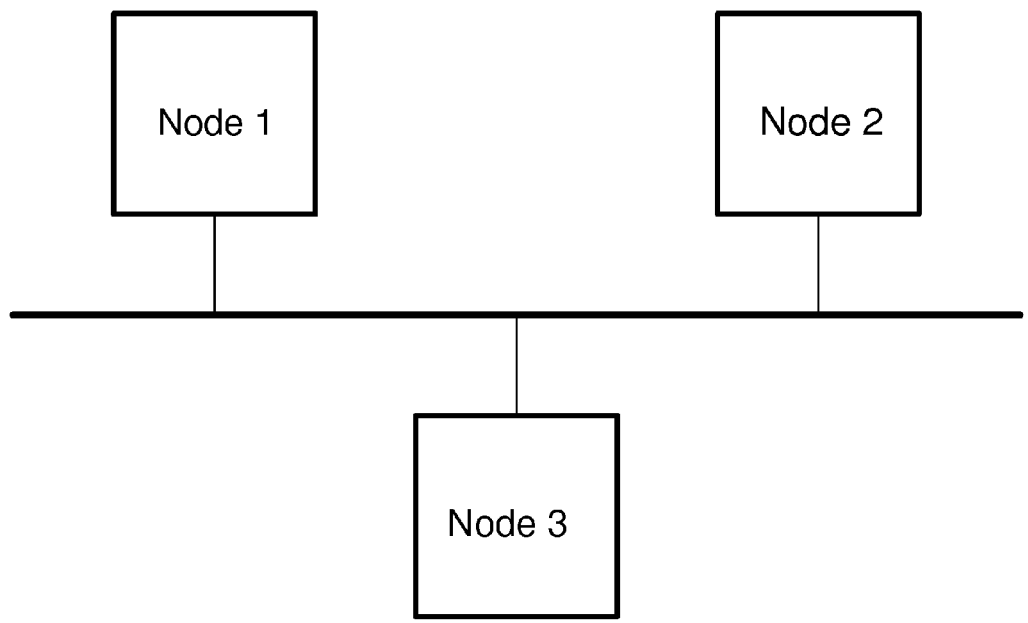
FIG. 1 is a schematic representation of a communication system which operates with a single means of transmission in accordance with the state of the art.
Figure 2:
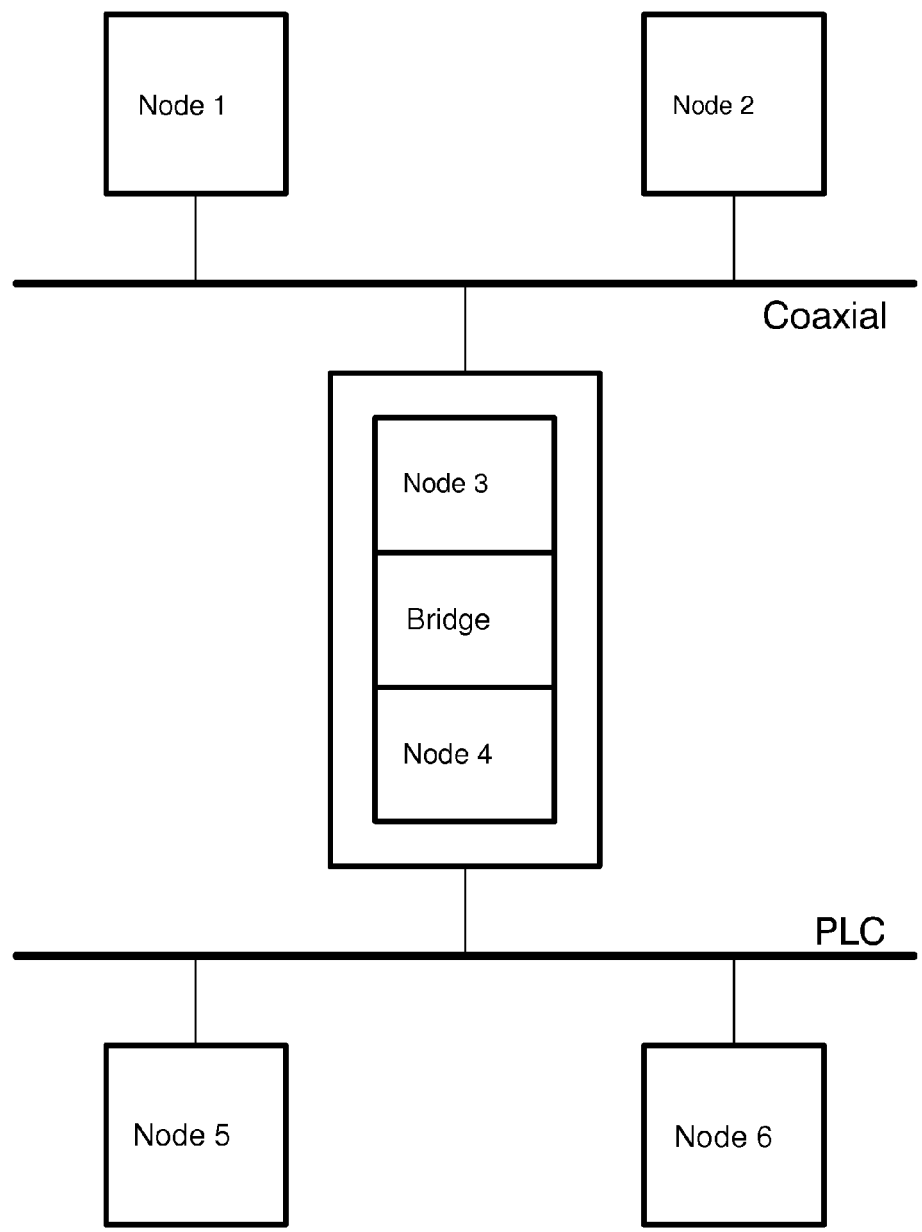
FIG. 2 is a representation of a communication system with two distinct transmission means in accordance with the state of the art.

As is illustrated in FIG. 3, when data is transmitted among the means, it has to pass through node 3. If node 1 wants to communicate with node 6, node 1 will transmit the message first to node 3, and it will be this node 3 which retransmits the message so that node 6 may receive the message. In this setup, node 3 acts as repeater, instead of as a bridge, as takes place in FIG. 2), using the data repetition functions at the LLC (Link Layer Control) level. This is important because security is defined within each network. If a bridge is used, the packages passing through the bridge are decrypted and are encrypted again, so that the bridge is a point where an intruder can attack the security of the network.

In this configuration, the capacity of the network is more or less similar to what can be obtained on the power line network but with the benefit that the connections through the coaxial cable would operate at higher velocity than those on the PLC (the coaxial is normally less noisy than the PLC but with fewer connection points). In an implementation example, a domain master situates the transmissions between nodes connected to the coaxial means at times when the noise in the PLC is too high to permit transmitting through it. In another example, one transmits simultaneously between nodes connected to the coaxial means and nodes connected to the PLC, provided that the node connected to both means is not involved simultaneously in said communications (it should only participate in one of said communications). If there are two nodes connected to the means, the two are potential repeaters for the data packages that have to pass from one means to the other. Depending on the instance of the channel features, it may be that the packages between two nodes located on different means use one of said nodes as a repeater and that the packages among another pair of nodes use another of said nodes as a repeater.

As mentioned before, a node can be connected to one, two, three or four means, as can be observed in FIG. 4.

In this case, communications between nodes 3, 4 and 7 can use the coaxial and telephone means simultaneously. This permits sending different data (even though from the same data flow or stream) by each of the means whereby the transmission speed or rate is duplicated.

In another specific example (FIG. 4), two nodes are used with two AFEs (nodes 3 and 4), each of which are connected respectively to the phone wire and the coaxial cable; they use both means to communicate, whereby the transmission speed or rate is the sum of what is obtained with each means. Use of the MIMO process (Multiple-Input Multiple-Output) is necessary in the case of interference between the two means (in particular, between the PLC and the telephone wire); if there isn't any interference, they can be treated as totally independent channels. On the other hand, interference can be beneficial when a node uses two means and the other node uses one, since one can use the MISO process (Multiple-Input Single-Output) or SIMO (Single-Input Multiple-Output). In the first case, transmission takes place by two means so that the signal received in one means is maximized. In the second case, one transmits by one means and the signal is detected on both and it is combined to increase the signal/noise ratio and diversity.

Figure 5:
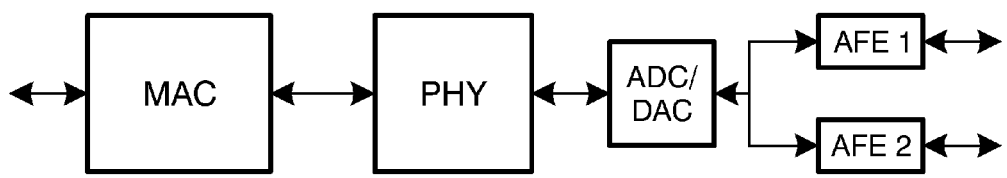
FIG. 5 is a representation of a node of the communication system that can operate on two means simultaneously in accordance with this invention.

In the example of FIG. 5, the same signal is transmitted by both AFEs and in each means, the proper power is injected. The form of the PSD is identical, except if an additional analog filter is used, but the level of the PSD depends on the means. During receiving, one of the two channels is selected. This selection can be achieved with an analog activity detector or because the node that interconnects the means is the master for the network and knows at any time what node can transmit and therefore, from what means one must listen.

Figure 6:
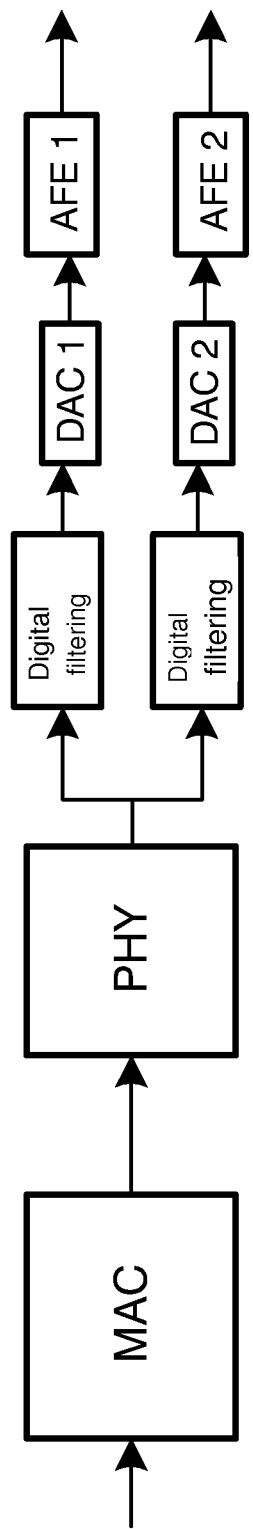
FIG. 6 is an alternative representation of the transmitter of a node that can operate with two means simultaneously in accordance with this invention.

In another example, two different DAC converters (digital-to-analog converters) are incorporated. This implementation is shown in FIG. 6 (for simplicity purposes, only the transmission is shown). In this way, a digital filtering can be applied to adapt the signal (PSD) to each means.

In another specific embodiment, the system includes two ADCs (analog-to-digital converters) and a digital selection is made of the signal upon receiving it. This selection (FIG. 7) would be based on the detection of specific signals (generally called "preamble") which is much more reliable than the analog selection.

In another specific example (FIG. 8), in the transmission mode, there are two different blocks of processing at the PHY level (physical level for the OSI model of ISO). As such, the PSD configuration for each means is much more flexible since it permits the use of different carrier power masks for each signal. For receiving, we would have the scheme shown in FIG. 9.

Figure 7:
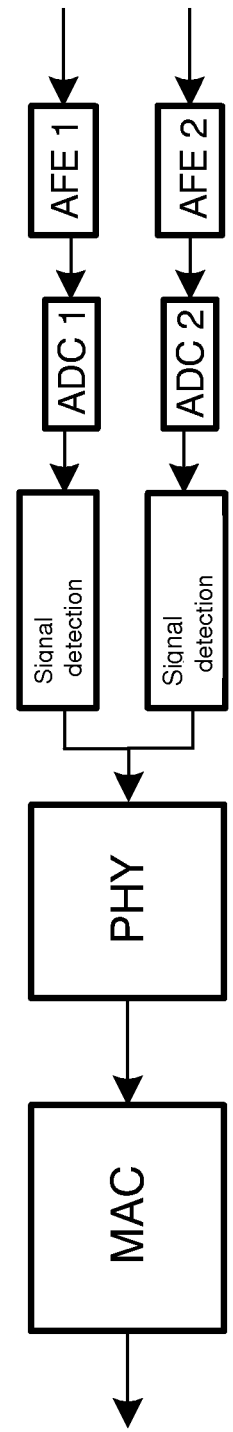
FIG. 7 is an alternative representation of the receiver of a node which can operate with two means simultaneously in accordance with this invention.
Figure 8:
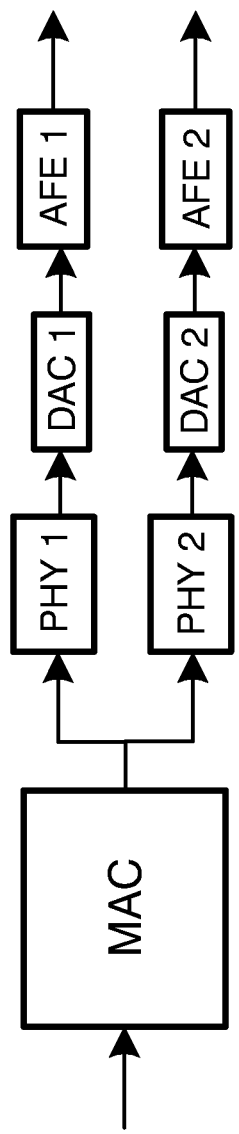
FIG. 8 is a second alternative representation of the transmitter of a node which can operate with two means simultaneously in accordance with this invention.
Figure 9:
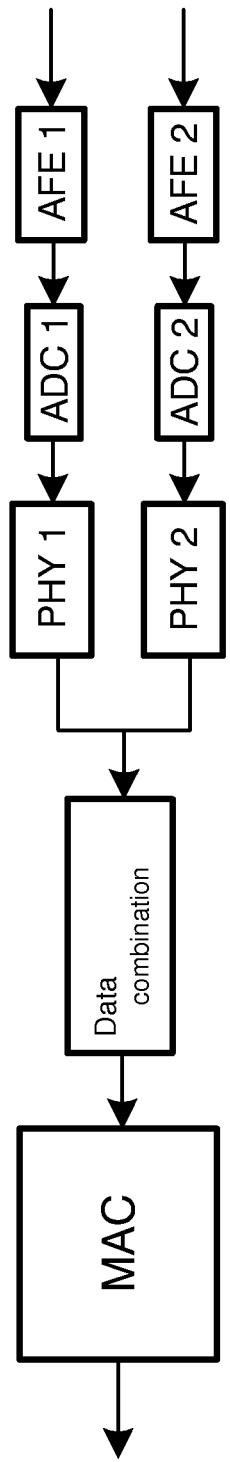
FIG. 9 is a second alternative representation of the receiver of a node that can operate with two means simultaneously in accordance with this invention.

In the examples of FIGS. 5, 6 and 7, the data transmitted by each channel is the same. In the example of FIG. 8, it is possible to transmit identical data by each channel or different ones. Likewise, with the receiver of FIG. 9, equal or different data can be received by each channel.

If the same data has been transmitted on both channels, the data extracted with each PHY would be combined. This can be done using the MRC (Maximum ratio combining), with an SNR based metric of each channel, etc. This also applies to the case where one received from a node which only transmits over one means. In that case, there could be a certain interference coupled to another means, whereby a signal would be received over both means. If there is no interference, the combination will take it into account automatically, since the SNR will be 0 in the means into which no power was injected.

If the information transmitted is different, the data received would be multiplexed on each channel in the proper form. In this case, the MIMO process can be used for receiving to cancel the interference and to extract the information from the different channels. This is not necessary, if there is no interference and the different channels can be treated independently.

In the event there is interference, the same OFDM parameters must be used for all channels, if not, the interference would destroy the signal and it would not be possible to use the MIMO process. If there is no interference, the OFDM parameters can be different, irrespective of whether the same information is transmitted or not over each channel (in any event, the data flow or stream transmitted at the MAC level is always single).

The frequency bands which are used for each means can be the same or can be different. Use of different frequency bands is also a manner for avoiding interference.

When selecting OFDM parameters, the optimum choice is the OFDM parameters applied with PLC, since they are the ones that have a greater duration of the OFDM symbol and therefore, they permit the use of a greater cyclic prefix with which to face the great dispersion of the channel response.

In the event of transmissions for which only one means (two nodes that only have one AFE) is used, the optimal parameters can be used for that means. In addition, in the event that there is no interference among the means (or such interference is sufficiently low), transmission can take place simultaneously over another means.

Another aspect of the invention allows for the joint use of the conductors of various means as a set of M conductors onto which M−1 signals can be injected plus an additional M−1 using the common mode which would return through the ground. In an implementation example, the PLC means has three conductors (normally for phase, neutral and ground) and a telephone line is formed by a pair of wires so that we would have a set of 5 conductors into which we could inject up to 5 signals in parallel which would be transmitted and received using the MIMO process.

Though the examples refer to the interconnection of two means, the interconnection of three or more means would take place in the same way.

This invention resolves problems associated with connecting communication nodes among each other connected in turn to different transmission means to achieve a simpler common communications network with greater coverage than the ones presently in existence.

In addition, the installation process is also simplified by eliminating the need to determine which nodes are connected to each means, since all nodes can communicate among each other.

What is claimed is:

1. A first node comprising:
   at least one physical layer device;
   a first transceiver comprising a first analog front end connected to a first transmission line, wherein the first analog front end is configured to transfer first data between the at least one physical layer device and a second node via the first transmission line; and
   a second transceiver comprising a second analog front end connected to a second transmission line, wherein the second analog front end is configured to transfer second data between the at least one physical layer device and a third node via the second transmission line,
   wherein a first type of the second transmission line is different than a second type of the first transmission line,
   wherein the first node is configured to perform as a repeater using data repeating functions at a link layer control level, and
   wherein the first transceiver is configured to, via the first transmission line, transmit a first portion of the first data to the second node or receive the first portion of the first data from the second node while the second transceiver, via the second transmission line, transmits a second portion of the first data to the second node or receives the second portion of the first data from the second node.

2. The first node of claim 1, wherein:
   the first type is one of a power line system type, a telephone line type, a coaxial line type, and an Ethernet cable type; and
   the second type is one of a power line system type, a telephone line type, a coaxial line type, and an Ethernet cable type.

3. The first node of claim 1, wherein:
   the first type is a power line system type; and
   the second type is one of a telephone line type and a coaxial line type.

4. The first node of claim 1, wherein:
   the first transmission line has a different transmission speed than the second transmission line; and
   the first transmission line has a different power spectral density than the second transmission line.

5. The first node of claim 1, wherein the first node transfers the first data and the second data without performing decryption and encryption.

6. The first node of claim 1, further comprising a media access controller in communication with the at least one physical layer device.

7. The first node of claim 1, wherein:
   the first transceiver is configured to transmit a data signal to the first transmission line; and
   the second transceiver is configured to transmit the data signal to the second transmission line.

8. The first node of claim 1, wherein the first transceiver is configured to transmit the first data to the first transmission line while the second transceiver transmits the second data to the second transmission line.

9. The first node of claim 1, wherein the at least one physical layer device comprises:
   a first physical layer device configured to transfer the first data between at least one media access controller and the first analog front end; and
   a second physical layer device configured to transfer the second data between the at least one media access controller and the second analog front end.

10. The first node of claim 1, wherein the first transceiver is configured to transmit the first portion of the first data to the second node via the first transmission line while the second transceiver transmits the second portion of the first data to the second node via the second transmission line.

11. The first node of claim 1, wherein the first transceiver is configured to receive the first portion of the first data from the second node via the first transmission line while the second transceiver receives the second portion of the first data from the second node via the second transmission line.

12. The first node of claim 1, further comprising:
   a first analog-to-digital converter configured to convert a first data signal received from the first transmission line into a first analog signal; and
   a second analog-to-digital converter configured to convert a second data signal received from the second transmission line into a second analog signal.

13. The first node of claim 1, further comprising:
   a first digital-to-analog converter configured to convert a first data signal into a first analog signal prior to transmission of the first analog signal via the first transmission line; and a second digital-to-analog converter configured to convert a second data signal into a second analog signal prior to transmission of the second analog signal via the second transmission line.

14. The first node of claim 1, wherein:
the first transceiver is configured to transmit a first signal comprising the first data and having a first frequency to the second node;
the second transceiver is configured to transmit a second signal comprising the second data and having a second frequency to the third node;
the first frequency is in a first frequency band;
the second frequency is in a second frequency band; and
the first frequency band is different than the second frequency band.

15. A first node comprising:
at least one physical layer device;
a first transceiver comprising a first analog front end connected to a first transmission line, wherein the first analog front end is configured to transfer first data between the at least one physical layer device and a second node via the first transmission line, and wherein the first transceiver is configured to receive a first signal comprising the first data from the first transmission line; and
a second transceiver comprising a second analog front end connected to a second transmission line, wherein the second analog front end is configured to transfer second data between the at least one physical layer device and a third node via the second transmission line, wherein the second transceiver is configured to receive a second signal comprising the first data from the second transmission line, and
wherein
a first type of the second transmission line is different than a second type of the first transmission line,
the first node is configured to perform as a repeater using data repeating functions at a link layer control level, and
the first node selects one of the first signal and the second signal.

16. A first node comprising:
at least one physical layer device;
a first transceiver comprising a first analog front end connected to a first transmission line, wherein the first analog front end is configured to transfer first data between the at least one physical layer device and a second node via the first transmission line; and
a second transceiver comprising a second analog front end connected to a second transmission line, wherein the second analog front end is configured to transfer second data between the at least one physical layer device and a third node via the second transmission line, and
wherein
a first type of the second transmission line is different than a second type of the first transmission line,
the first node is configured to perform as a repeater using data repeating functions at a link layer control level,
the at least one physical layer device comprises
a first physical layer device configured to receive the first data on a first channel, and
a second physical layer device configured to receive the first data on a second channel, and
the first node combines the first data received on the first channel with the first data received on the second channel using maximum ratio combining with a first signal-to-noise ratio metric of the first channel and a second signal-to-noise ratio metric of the second channel.

17. A first node comprising:
at least one physical layer device;
a first transceiver comprising a first analog front end connected to a first transmission line, wherein the first analog front end is configured to transfer first data between the at least one physical layer device and a second node via the first transmission line; and
a second transceiver comprising a second analog front end connected to a second transmission line, wherein the second analog front end is configured to transfer second data between the at least one physical layer device and a third node via the second transmission line, and
wherein
a first type of the second transmission line is different than a second type of the first transmission line,
the first node is configured to perform as a repeater using data repeating functions at a link layer control level,
the at least one physical layer device comprises
a first physical layer device configured to receive the first data on a first channel, and
a second physical layer device configured to receive the second data on a second channel,
the first node is configured to, based on a multiple-input multiple-output process, cancel interference associated with at least one of the first channel or the second channel, extract the first data from the first channel, and extract the second data from the second channel,
the first channel has orthogonal frequency-division multiplexing (OFDM) parameters, and
OFDM parameters of the second channel are equal to the OFDM parameters of the first channel.

18. A first node comprising:
at least one physical layer device;
a first transceiver comprising a first analog front end connected to a first transmission line, wherein the first analog front end is configured to transfer first data between the at least one physical layer device and a second node via the first transmission line, and wherein the first transceiver (i) transmits the first data to the second node via the first transmission line, or (ii) receives the first data from the second node via the first transmission line; and
a second transceiver comprising a second analog front end connected to a second transmission line, wherein the second analog front end is configured to transfer second data between the at least one physical layer device and a third node via the second transmission line, wherein the second transceiver (i) transmits the second data to the second node via the second transmission line, or (ii) receives the second data from the second node via the second transmission line, and
wherein
a first type of the second transmission line is different than a second type of the first transmission line,
the first node is configured to perform as a repeater using data repeating functions at a link layer control level, and
the first node (i) only receives data signals from the second node via the first transmission line, or (ii) only transmits data signals to the second node via the first transmission line.

19. The first node of claim 18, wherein:
the first transceiver receives the first data from the second node via the first transmission line;

the second transceiver receives the second data from the second node via the second transmission line; and the first node only transmits data signals to the second node via the first transmission line.

20. A first node comprising:

at least one physical layer device;

a first transceiver comprising a first analog front end connected to a first transmission line, wherein the first analog front end is configured to transfer first data between the at least one physical layer device and a second node via the first transmission line; and a second transceiver comprising a second analog front end connected to a second transmission line, wherein the second analog front end is configured to transfer second data between the at least one physical layer device and a third node via the second transmission line, and wherein a first type of the second transmission line is different than a second type of the first transmission line, and the first node is configured to perform as a repeater using data repeating functions at a link layer control level the first data is different than the second data, the first node is configured to multiplex the first data with the second data to generate a combined signal, and the combined signal includes the first data and the second data.

* * * * *